United States Patent
Saldinger et al.

[19]

[11] Patent Number: 5,926,475
[45] Date of Patent: Jul. 20, 1999

[54] METHOD AND APPARATUS FOR ENSURING ATM CELL ORDER IN MULTIPLE CELL TRANSMISSION LANE SWITCHING SYSTEM

[75] Inventors: Alan E. Saldinger, Los Altos; James Ding, Fremont; Shirish K. Sathe, Cupertino, all of Calif.

[73] Assignee: Cisco Technology, Inc., San Jose, Calif.

[21] Appl. No.: 08/717,295

[22] Filed: Sep. 20, 1996

[51] Int. Cl.[6] .................................................... H04J 3/02
[52] U.S. Cl. ............................................................. 370/394
[58] Field of Search ................................. 370/394, 389, 370/395, 396, 420, 421, 422, 423, 424, 425, 442, 443, 444, 461, 462, 463, 473; 375/259, 260

[56] References Cited

U.S. PATENT DOCUMENTS 4,967,409  10/1990  Narumiya et al. ....................... 370/455
5,509,012  4/1996   Chung et al. ........................... 370/445
5,519,701  5/1996   Colmant et al. ........................ 370/412

*Primary Examiner*—Huy D. Vu
*Attorney, Agent, or Firm*—Blakely, Sokoloff, Taylor & Zafman LLP

[57] ABSTRACT

A multiple cell lane switching system includes a number of individual cards interconnected via a plurality of cell lanes. Each card includes devices for receiving a plurality of cells from a transmission line and for buffering cells in an order corresponding to the received cell order. Cells are transmitted from a first card across the plurality of cell lanes to a second card in an order corresponding to that in which that they were received from a first transmission line at the first card. At the second card, the cells are read from the cell lanes and buffered. Finally, the cells are transferred from the cell lane buffers of the second card to a second transmission line in an order replicates the order of cell reception at the first card.

8 Claims, 3 Drawing Sheets

METHOD AND APPARATUS FOR ENSURING ATM CELL ORDER IN MULTIPLE CELL TRANSMISSION LANE SWITCHING SYSTEM

FIELD OF THE INVENTION

The present invention relates generally to the field of communication networks and, more particularly, to the method and apparatus for ensuring cell order within such a network.

BACKGROUND

Packet switching communications networks such as asynchronous transfer mode (ATM) communication networks are typically made up of a number of communication nodes coupled for communication over a set of high speed communication links. Such a communication network usually enables communication among a wide variety of communication devices including video, voice, data and facsimile devices. The topology of such a communication network typically enables the establishment of a variety of communication paths between any two communication nodes in the network. Such a communication path is generally referred to as a virtual circuit in the communication network. Typically, a physical path though the communication nodes for such a virtual circuit is established according to bandwith utilization requirements for the virtual circuit and the available resources in the communication nodes and on the high speed communication links. The communication nodes discussed above often perform cell switching, that is, routing cells from one end-point to another, across the virtual circuits. Typically, these nodes or switches are made up of a number of port cards, with each card having circuitry for performing cell switching operations. Cells are passed between cards (i.e., between ports) over a system bus which interconnects each of the cards.

In many switches, there are multiple, memory-less, lanes for cells to take between two cards of the switch. In general, each card will have appropriate circuitry for transmitting and receiving cells across the cell lanes and for interfacing with the high speed transmission links of the communication network. FIG. 1 illustrates such a communication switch 10.

Communication switch 10 includes two cards 20, each of which are coupled to a cell bus 22 which is made up of four cell transmission lanes. Each card 20 is also coupled to a high speed transmission link 24. Those skilled in the art will appreciate that cards 20 include circuitry necessary for transmission and reception of ATM cells across cell bus 22 and across high speed links 24. In particular, as is typical of ATM switches such as switch 10, cards 20 include transmit and receive buffers 26 (for clarity only one transmit and receive buffer 26 is labeled, however, all are substantially similar).

For a single virtual circuit passing through switch 10, the order of cells appearing on the input must be preserved at the output. This is because ATM is a connection oriented scheme and no provision is made in the associated protocols for cell reordering. In switch 10, a card 20 is granted access to the cell bus 22 shortly before cell transmission is to start. Because ATM is asynchronous in nature, at this grant time there may be from zero to n (n=number of cell lanes) cells that could be sent during this transmit opportunity. For the example illustrated in FIG. 1 where cell bus 22 has 4 cell lanes, there may be from 0 to 4 cells that could be sent during a transmission opportunity. As multiple cells need to be sent in parallel, a card 20 may unload each of its first-in-first-out (FIFO) buffers 26 into an appropriate cell lane of cell bus 22 when the transmit opportunity occurs. However, this method of preparing multiple cells for transmission across the cell bus 22 presents the possibility of reordering cells on a particular virtual circuit.

For example, consider the switch design where cells are loaded as they are received from a high speed communication link 24 into four cell lane FIFOs 26 of a card 20 on a round robin basis. Suppose cells n and n+1 for a particular virtual circuit are received and are loaded into the first two cell lane FIFOs 26 for transmission on cell bus 22. Further suppose that just as cell n+2 is arriving on high speed communication link 24, a transmit opportunity for the card 20 arrives. Those skilled in the art will appreciate that these transmit opportunities are governed by a cell bus arbiter which controls access to cell bus 22 by multiple cards 20. When the transmit opportunity arrives, cells n and n+1 will be sent over the cell bus 22 to a destination card. If cell n+2 is then loaded into the lane 3 FIFO (because the FIFOs associated with lanes 1 and 2 were full just as cell n+2 arrived) then cell n+3, the next cell received over high speed communication link 24, is loaded into the cell lane 1 FIFO (because the contents of this FIFO have just been transmitted over cell bus 22). At the next transmit opportunity, if cells n+2 and cell n+3 are sent across cell bus 24, a destination card may think that cell n+3 came before cell n+2 since cell n+3 is now present on cell bus 22 lane 1. This would result in the ATM cells for single virtual connection being reordered at the destination card.

In order to prevent such a reordering, several alternatives exists. For example, a single virtual connection may be restricted to send cells only over a particular cell bus cell lane. However, this solution has several disadvantages. For instance, any particular virtual connection's bandwidth would be limited to that of a single cell lane. Also, extra circuitry and/or storage would be needed at each card 20 to keep track of the cell path assigned to each virtual connection.

Alternatively, extra ordering information (e.g., header information) within each cell on a cell path could be introduced. This could be thought of as tagging each cell with its order as it is placed onto a cell lane of cell bus 22. Using these tags, the receiving card 20 could sort out the order in which cells of a particular virtual connection were received. The disadvantage here is that the additional overhead required for the tags reduces the overall cell path bandwidth which is used for switching cells between cards.

SUMMARY AND OBJECTS OF THE INVENTION

Accordingly, it is an object of the present invention to provide a method and apparatus for ensuring ATM cell order in a multiple cell transmission lane switching system.

It is a further object of the present invention to provide for maintaining ATM cell order in a multiple cell transmission lane switching system without restricting cell switching to a single cell path.

It is a further object of the present invention to provide for ATM cell ordering in a multiple cell transmission lane switching system which does not reduce the available cell path bandwidth for intranode switching.

These and other objects of the invention are accomplished in a multiple cell lane switching system in which individual cards are interconnected via a plurality of cell lanes. Each card includes means for receiving a plurality of cells and for buffering these cells in an order corresponding to the received cell order. Cells received at a first card are transmitted from the first card across the plurality of cell lanes to a destination card in an order corresponding to that in which that they were received. At the destination card, the cells are read from the cell lanes and buffered. Finally, the cells are transferred from the cell lane buffers of the destination card to a transmission line in a predetermined order such that the order of cell transmission replicates the order of cell reception at the first card.

BRIEF DESCRIPTION OF THE DRAWINGS

The present invention is illustrated by way of example and not limitation in the figures of the accompanying drawings in which like numerals indicate similar elements and in which.

DETAILED DESCRIPTION

A method and apparatus for ensuring ATM cell order in a multiple cell transmission lane switching system is described. Cells which are transmitted from a first card of the switching system to a destination card of the switching system over the multiple cell lanes of the switch arrive at the destination card over a single interface. As multiple cells are transmitted simultaneously over the cell lanes on very short notice after a cell bus arbiter grants the first card access to the cell lanes, the interface prepares the proper number of cells so that they can be transmitted quickly. This is accomplished using, in one embodiment, a ring buffer structure of cell RAMS, with each cell lane being fed by each of these RAMS through a multiplexer. This allows individual cells to be bound to a particular cell lane of the cell bus just as the bus grant is given. This ensures strict cell ordering by lane number at the source. At the destination card of the switching system, "ping-pong" buffers are used for each cell lane to ensure that cells from a given "cell time" are processed in lane order before processing any cells from the next "cell time". This combination ensures cell ordering per virtual connection is maintained.

Figure 1:
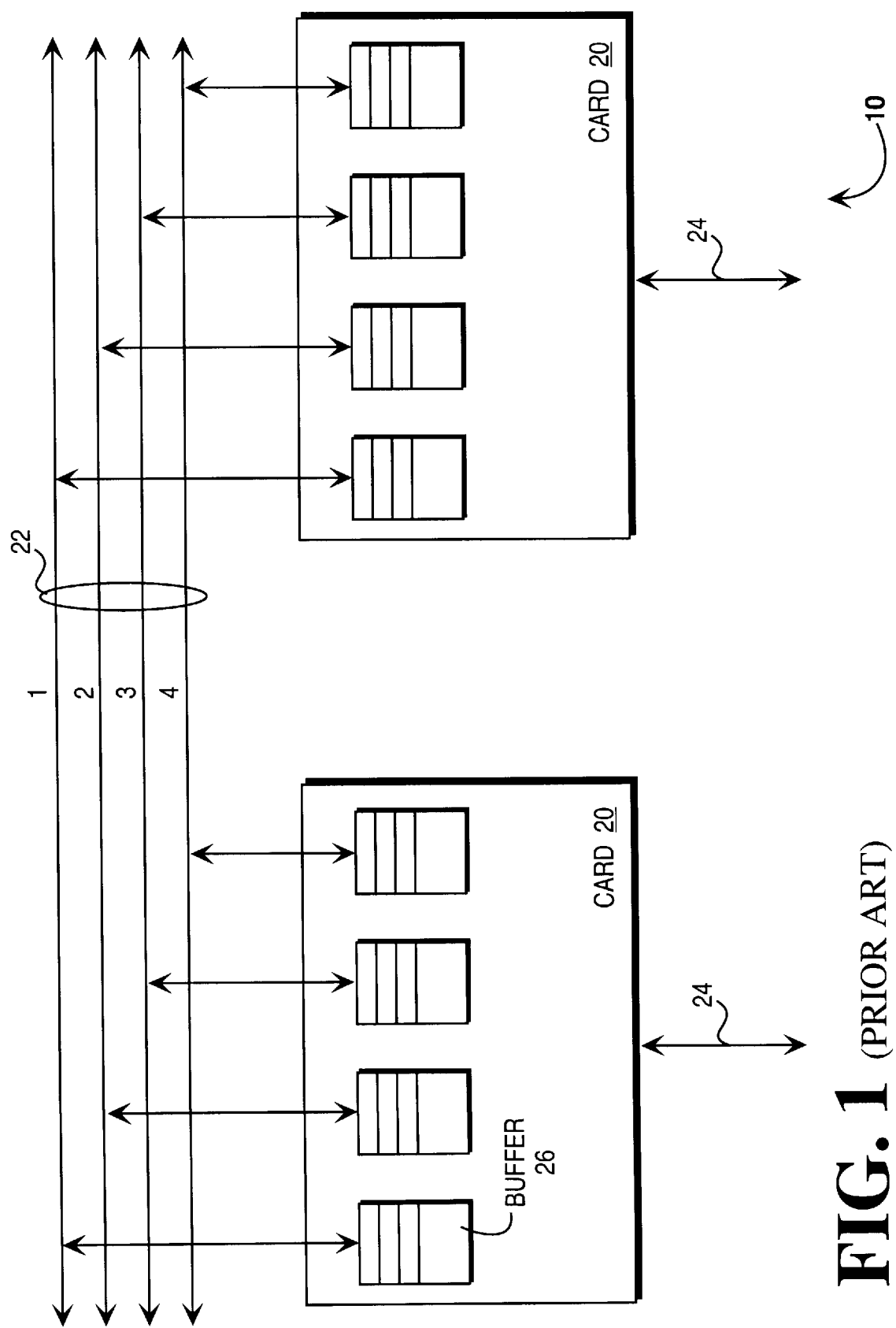
FIG. 1 illustrates a multiple cell lane switching system of the prior art.
Figure 2:
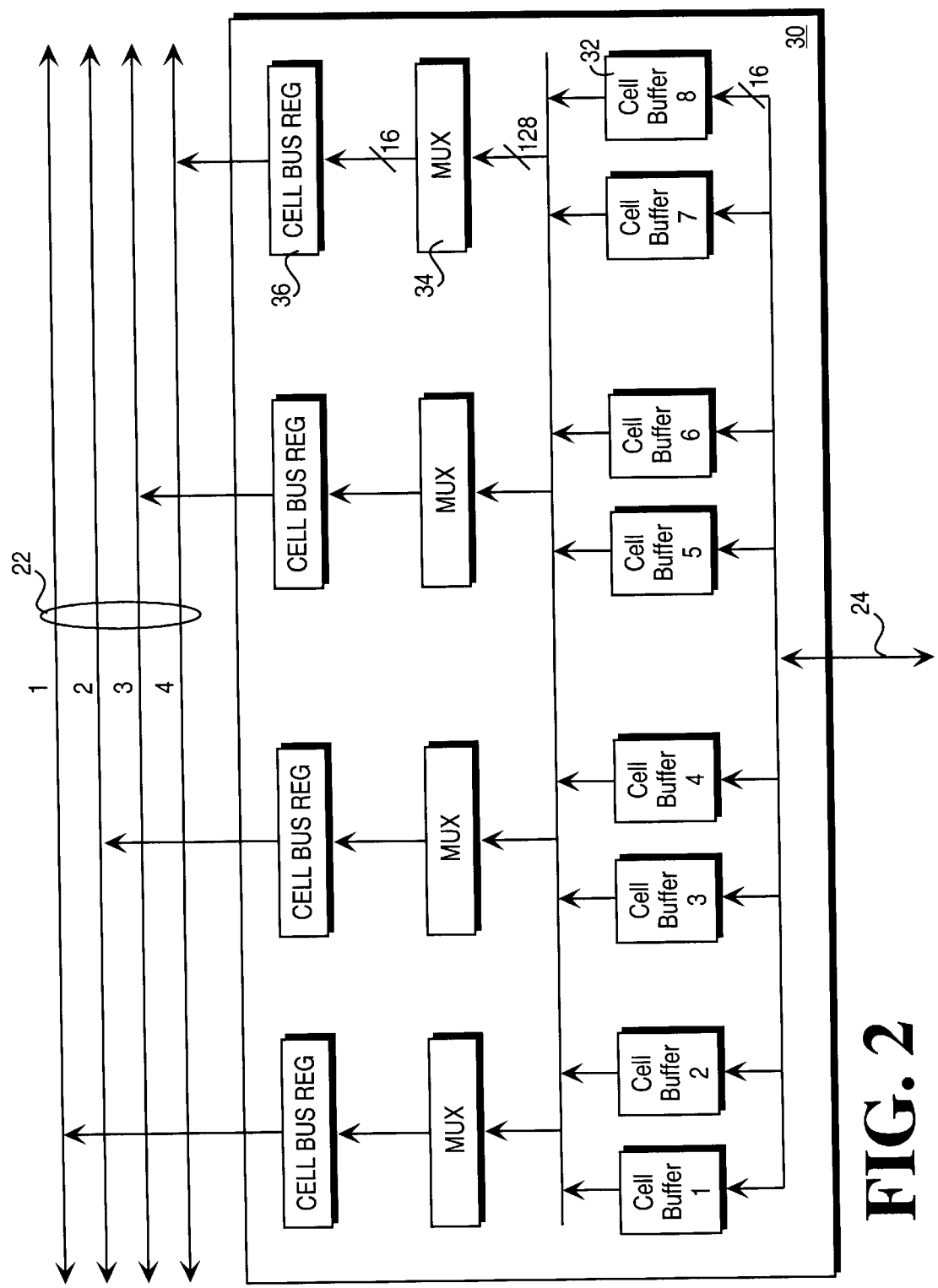
FIG. 2 illustrates a transmit portion of a multiple cell lane switching system according to the present invention.

FIG. 2 illustrates the details of a transmit operation for a four cell lane implementation. Card 30 includes four cell bus registers 36, corresponding to the four cell lanes of cell bus 22. Each lane of cell bus 22 is 16-bits wide. It will be appreciated that, in other embodiments, various numbers of cell lanes and cell bus registers may be used and the cell lanes may have different widths. Each cell bus register 36 is coupled to a corresponding multiplexer 34. For the embodiment of FIG. 1, each multiplexer 34 shown is a combination of sixteen 8:1 multiplexers. Thus, each multiplexer 34 has 128 input lines and 16 output lines. However, equivalent circuits made up of other combinations of multiplexers in order to arrive at this ratio can also be used. In addition, card 30 contains eight cell buffers 32. The eight cell buffers 32 make up a ring buffer for card 30. Each of the eight cell buffers 32 are coupled to each of the multiplexers 34.

Cells are received at card 30 across interface 24. For one embodiment, interface 24 is the well-known Utopia-2 interface. The cells are received into the ring buffer as follows. Each cell buffer 32 is written in round robin style according to a write pointer. Preferably, the maximum write rate is at least slightly greater than the cell bus 22 rate. The writing of each of these cell buffers 32 stops only when all eight cell buffers 32 are full or when there are no cell available from interface 24. As each cell is received across interface 24, the cell is written into the cell buffer 32 that is pointed to by the write pointer and the write pointer is then incremented to point the next cell buffer 32 in a round robin fashion. After cell buffer 8 is written, the write pointer loops back to indicate cell buffer 1. In this way, cell buffers 32 make up a ring buffer.

When card 30 is granted access to cell bus 22, up to four full cell buffers, beginning at a read pointer (RP) location, are simultaneously read and directed to an appropriate cell bus lane through multiplexers 34 and cell bus registers 36. Read pointer RP corresponds to cell bus 22 lane 1, RP+1 corresponds to cell bus 22 lane 2, etc. Using the read pointer then, if cell buffer 5 stores the first cell to be transmitted across cell bus 22 during a transmit opportunity (and, therefore, cell buffer 6 stores the next cell, cell buffer 7 the following cell, etc.) the output of cell buffer 5 will be directed to the multiplexer 34 and cell bus register 36 which correspond to cell bus 22 lane 1. Similarly, the output of cell buffer 6 would be directed to the mutliplexer 34 and cell bus register 36 which correspond to cell bus 22 lane 2, etc. In this fashion, cells are read out in order onto cell bus 22, lane 1 before lane 2, before lane 3, before lane 4, so that the destination card ensures cells that are received simultaneously on cell bus 22 are processed in cell lane order. When all the cells which are available for transmission across the cell bus 22 during a transmit opportunity (up to a maximum of the number of cell lanes) have been sent, read pointer RP is incremented by the number of cells transmitted so that the next cell in order of reception at card 30 is directed to lane 1 of cell bus 22 during the next transmit opportunity.

Figure 3:
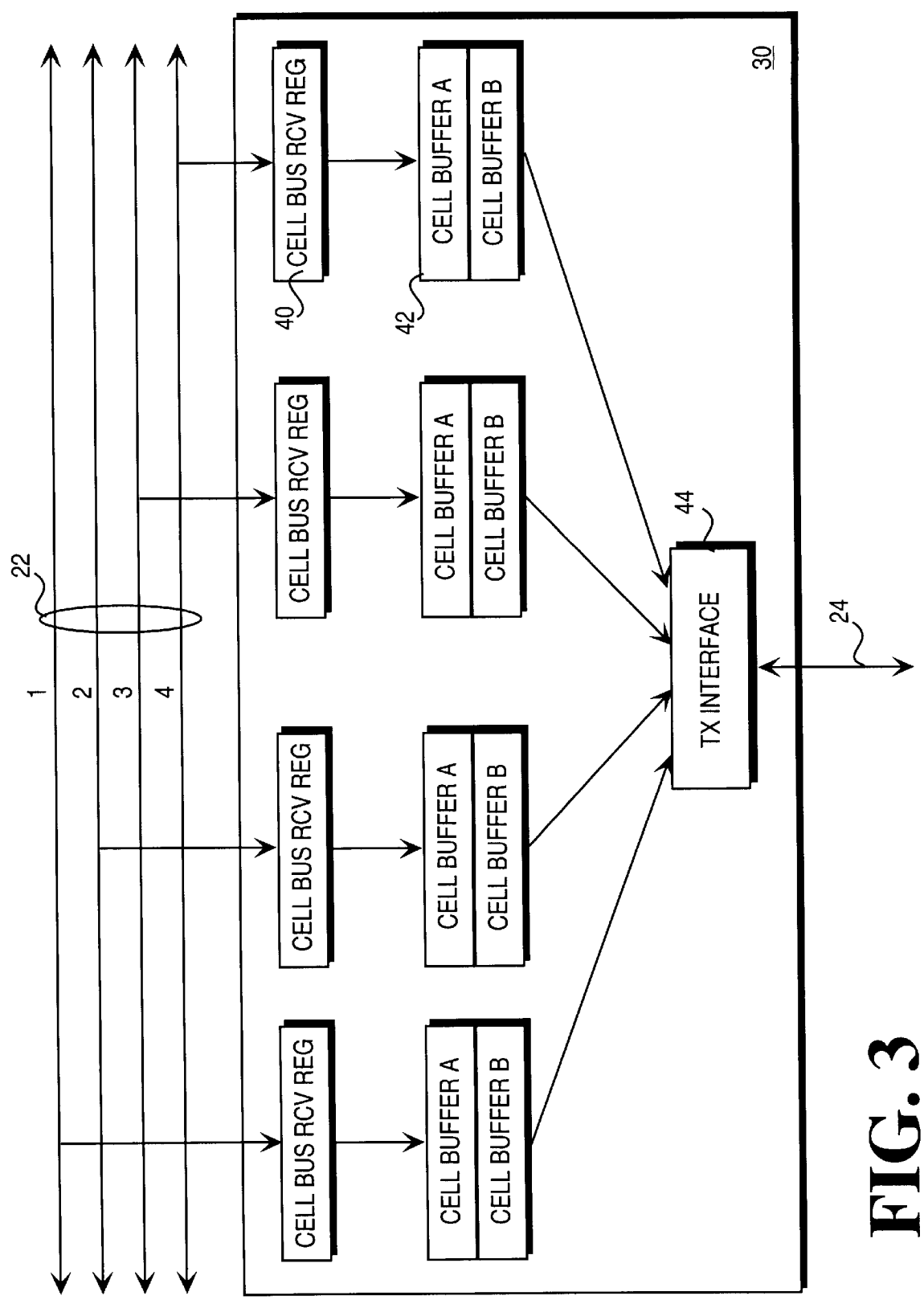
FIG. 3 illustrates a receive portion of a multiple cell lane switching system according to the present invention.

FIG. 3 illustrates the receive portion of a card 30. Each card 30 includes four cell bus receiving registers 40 which are each coupled to a respective cell lane of cell bus 22. It will be appreciated that the number of cell bus receiving registers 40 corresponds to the number of cell lanes which make up cell bus 22. Coupled to each of the cell bus receiving registers 40 is a corresponding "ping-pong" cell buffer 42. Each ping-pong cell buffer 42 has an A portion and a B portion. Each of the ping-pong buffers 42 is coupled to the transmit interface 44 of card 30. In one embodiment, this may correspond to the familiar Utopia-2 transmit interface. The transmit interface 44 is coupled to a high speed communication link 24.

During each "cell time", that is the time that cells are present on cell bus 22 and are available for reception at card 30, cells on each lane are received into a corresponding cell bus receiving register 40 and passed to a corresponding ping-pong buffer 42. The cells received at each cell bus receiving register 42 will be transferred to that portion of the corresponding ping-pong buffer 42, A or B, which is not currently transmitting cells to the transmit interface 44. During the reception operation, the virtual circuit header information in each cell is checked to determine whether the cell should be processed by the receiving card 30.

During the reception operation, any cells which were received during the last "cell time" (and which passed a VC header check indicating the cells were destined for a VC supported by card 30) are transferred from the ping-pong buffers 42 to the transmit interface 44. Cells are transferred in strict cell lane order, lane 1 before lane 2, before lane 3, before lane 4. In this way, strict cell lane order per cell time is maintained.

Thus, using the methods and apparatus described above, cell order in a multiple cell transmission lane switching system is maintained. Although described with reference to particular embodiments thereof, those skilled in the art will appreciate that the present invention may be practiced without some or all of the details of these embodiments. For example, a single, multiple-port RAM rather than individual RAMS may be used for the cell buffers 32. In addition, tri-stating schemes may be used rather than multiplexers 34. Accordingly, the present invention is to be limited only by the claims which follow.

What is claimed is:

1. A method of ensuring cell order in a multiple cell lane transmission switching system, the method comprising the steps of:

receiving a plurality of cells at a first card of a multiple cell lane transmission switching system;

buffering said plurality of cells at said first card in an order corresponding to a received cell order, wherein said buffering includes writing one of said plurality of cells into a first device according to a write pointer;

incrementing said write pointer;

repeating said steps of writing and incrementing until either all positions in said first device are full or all of said plurality of cells have been buffered;

transmitting said plurality of cells from said first card to a second card of said multiple cell lane transmission switching system across a plurality of cell lanes by writing each of said plurality of cells from said first card to a respective one of said cell lanes in an order corresponding to said received cell order;

receiving said plurality of cells at said second card by reading each of said plurality of cell lines into a respective one of a plurality of receive buffers; and transferring said plurality of cells from said receive buffers to a transmission interface in a predetermined order.

2. A method for ensuring cell order as in claim 1 wherein said first device comprises eight cell buffers and said step of incrementing said write pointer comprises incrementing said write pointer such that said write pointer indicates a next available cell buffer.

3. A method for ensuring cell order as in claim 2 wherein said step of transmitting comprises the steps of:

reading up to four of said cell buffers in an order according to the received cell order; and transferring a cell from each one of said up to four cell buffers to a respective cell transmission lane according to the received cell order.

4. A method for ensuring cell order as in claim 3 wherein said step of transferring a cell from each one of said four cell buffers comprises the steps of:

transferring a first cell from a first of said four cell buffers to a first of said cell lanes through a first multiplexer;

transferring a second cell from a second of said four cell buffers to a second of said cell lanes through a second multiplexer;

transferring a third cell from a third of said four cell buffers to a third of said cell lanes through a third multiplexer; and transferring a fourth cell from a fourth of said four cell buffers to a fourth of said cell lanes through a fourth multiplexer.

5. A multiple cell lane switching system having a first card and a second card interconnected via a plurality of cell lanes, comprising:

a circuit configured to receive a plurality of cells at said first card of said multiple cell lane switching system;

a circuit configured to buffer said plurality of cells at said first card in an order corresponding to a received cell order coupled to said circuit configured to receive, wherein said order is maintained via a write pointer;

a circuit configured to transmit said plurality of cells from said first card to said second card across said plurality of cell lanes, said circuit configured to transmit said plurality of cells having a plurality of multiplexers, each of said plurality of multiplexers corresponding to a respective one of said cell lanes, wherein circuit configured to transmit said plurality of cells is operable to write each of said plurality of cells from said first card to a respective one of said cell lanes in an order corresponding to said received cell order;

a circuit configured to receive said plurality of cells at said second card by reading each of said plurality of cell lanes coupled to said cell lanes;

a plurality of receive buffer coupled to said circuit configured to receive said plurality of cells, each of said receive buffers configured to receive cells from a respective cell lane; and circuit configured to transfer cells from each of said receive buffers to a transmission interface in a predetermined order, said circuit configured to transfer cells coupled to each of said receive buffers.

6. A multiple cell lane switching system as in claim 5 wherein said circuit configured to buffer comprises a ring buffer.

7. A multiple cell lane switching system as in claim 6 wherein said ring buffer comprises a plurality of cell buffers.

8. A multiple cell lane switching system as in claim 5 wherein said receive buffers each comprising a ping-pong buffer.

* * * * *